United States Patent [19]

Luschen et al.

[11] 3,742,838

[45] July 3, 1973

[54] VERTICAL GRILL DEVICE

[76] Inventors: Fred H. Luschen, 711 Greenview Road, Irasca; Raymond C. Piccony, 246 Pamela Drive, Bensenville, both of Ill.

[22] Filed: Nov. 1, 1971

[21] Appl. No.: 194,210

[52] U.S. Cl. ............... 99/389, 99/421 H, 126/25
[51] Int. Cl. .............................. A47j 37/07
[58] Field of Search .................. 99/389, 259–260, 99/261–262, 339–340, 372–375, 400, 408, 421 HH, 421 HV, 425, 443–444, 446; 126/25, 30

[56] References Cited
UNITED STATES PATENTS

| | | | |
|---|---|---|---|
| 2,441,190 | 5/1948 | Fuller | 126/25 R |
| 3,556,078 | 1/1971 | McGaughey | 126/25 R |
| 1,836,894 | 12/1931 | Bedigian | 99/389 UX |
| 2,923,229 | 2/1960 | Halford | 99/339 |
| 2,335,217 | 11/1943 | Tate | 99/444 UX |
| 3,140,651 | 7/1964 | Barnett | 99/389 X |

Primary Examiner—John Petrakes
Assistant Examiner—Arthur O. Henderson
Attorney—Richard W. Carpenter

[57] ABSTRACT

A grill device for cooking food by means of heating materials such as charcoal or the like, including a housing adapted to enclose and support a food holding member and a pair of heating material holding members adjustably positionable on opposite sides of the food holding member.

5 Claims, 5 Drawing Figures

VERTICAL GRILL DEVICE

It is a primary object of this invention to provide, in a device of the type described, an arrangement wherein a housing or oven is adapted to receive a pair of vertically disposed heating material holding members in any one of a plurality of positions spaced on opposite sides of a vertically disposed food holding member to control the amount of heat transmitted to the food being cooked.

A more specific object of the invention is to provide, in a device of the type described, a housing having a plurality of recesses in the end walls thereof adapted to removably receive the food holding and heating material holding material members in various selectable positions.

These and other objects of the invention will be apparent from an examination of the following description and drawings, wherein.

It will be understood that, for purposes of clarity, certain elements have been intentionally omitted from certain views where they are believed to be illustrated to better advantage in other views.

Figures 1, 2:
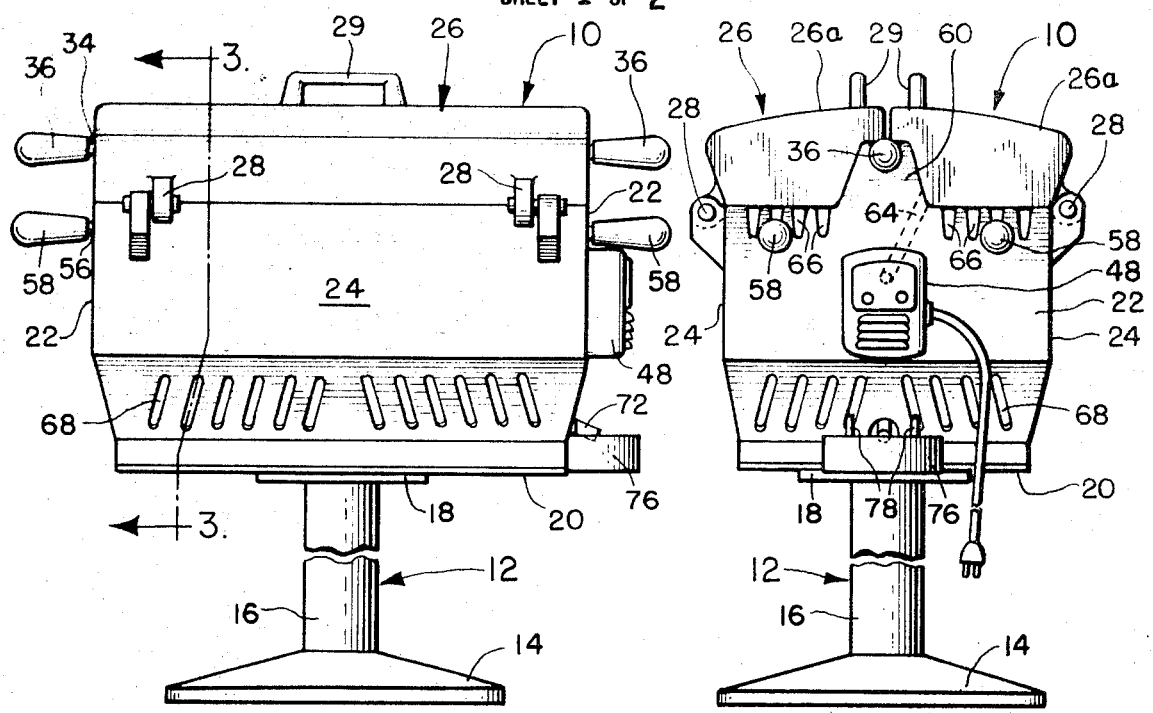
FIG. 1 is a side elevation of a vertical grill device embodying features of the invention.
FIG. 2 is an end elevation of the structure illustrated in FIG. 1.
Figure 3:
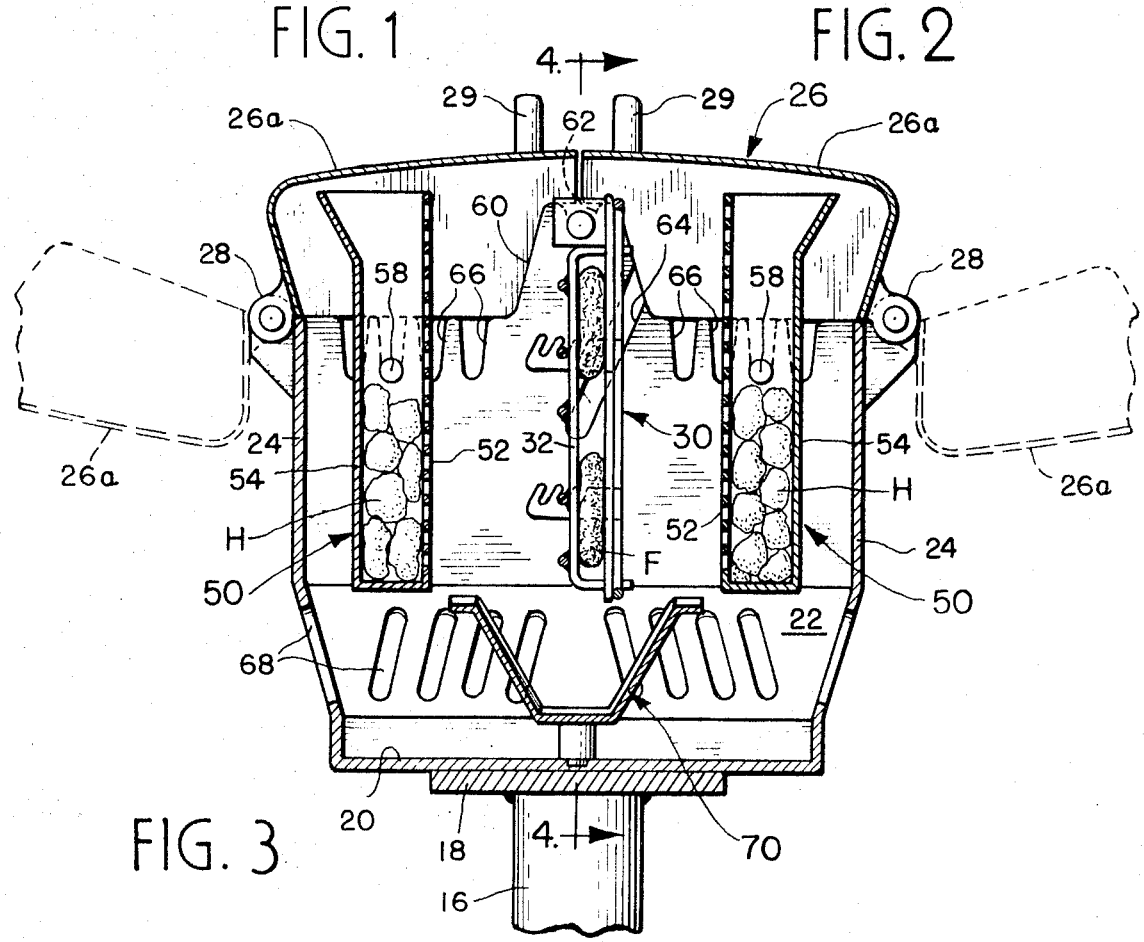
FIG. 3 is a transverse vertical section taken on line 3—3 of FIG. 1, with the open position of the cover sections being shown in phantom lines.

Referring now to the drawings for a better understanding of the invention, and particularly to FIGS. 1 and 3, it will be seen that the novel grill embodying features of the invention includes an enclosed housing or oven, indicated generally at 10, supported on a pedestal 12 which includes a base 14 having extending upwardly therefrom a pole 16 carrying at its upper end a base plate 18 on which housing 10 is mounted.

As best seen in FIG. 3, housing or oven 10 includes a general horizontal bottom wall 20 having integrally formed opposed pairs of end and side walls 22 and 24, respectively, extending upwardly therefrom to form a box-like enclosure open at the top. Preferably, the lower portions of the end and side walls 22 and 24 are inclined inwardly, as best seen in FIGS. 1 and 2.

The top of housing 10 may be closed by a cover 26 which includes a pair of cover sections 26a which meet at the center of the housing and which are hinged to the upper portions of the side walls 24 by means of hinges 28.

Each of the cover sections 26a may be provided with a handle 29. It will be understood that, although in the arrangement shown, the cover consists of two cover sections, if desired, the cover may be formed in a one-piece structure extending across the entire top of the housing and hinged to only one of the sidewalls.

As best seen in FIG. 3, it will be noted that the hinge arrangement of the cover is preferably designed to permit the cover sections, when in the open position, to be disposed in a general horizontal plane so they can also serve as shelves for receiving the food or heating material holding members as they are being filled prior to their insertion into the housing, in a manner hereinafter described.

As best seen in FIG. 3, the food holding member may comprise an open grillwork type basket, indicated generally at 30, having a removable cover 32, which may be adjustably positioned to accommodate varying thicknesses in the food placed therein. At its upper end member 30 may be provided with a pair of outwardly projecting axially aligned shafts or spindles 34, carrying at their extremities handles 36.

Figure 4:
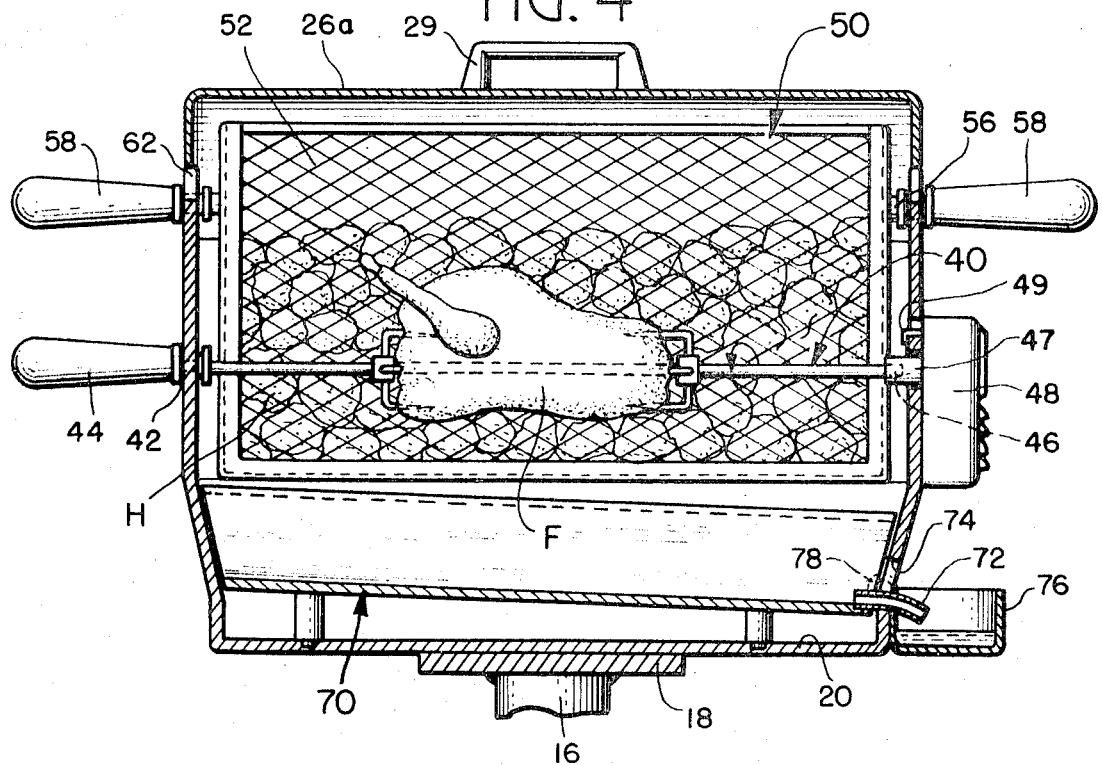
FIG. 4 is a longitudinal, vertical section taken on line 4—4 of FIG. 2, but showing a modified form of food holding member.
Figure 5:
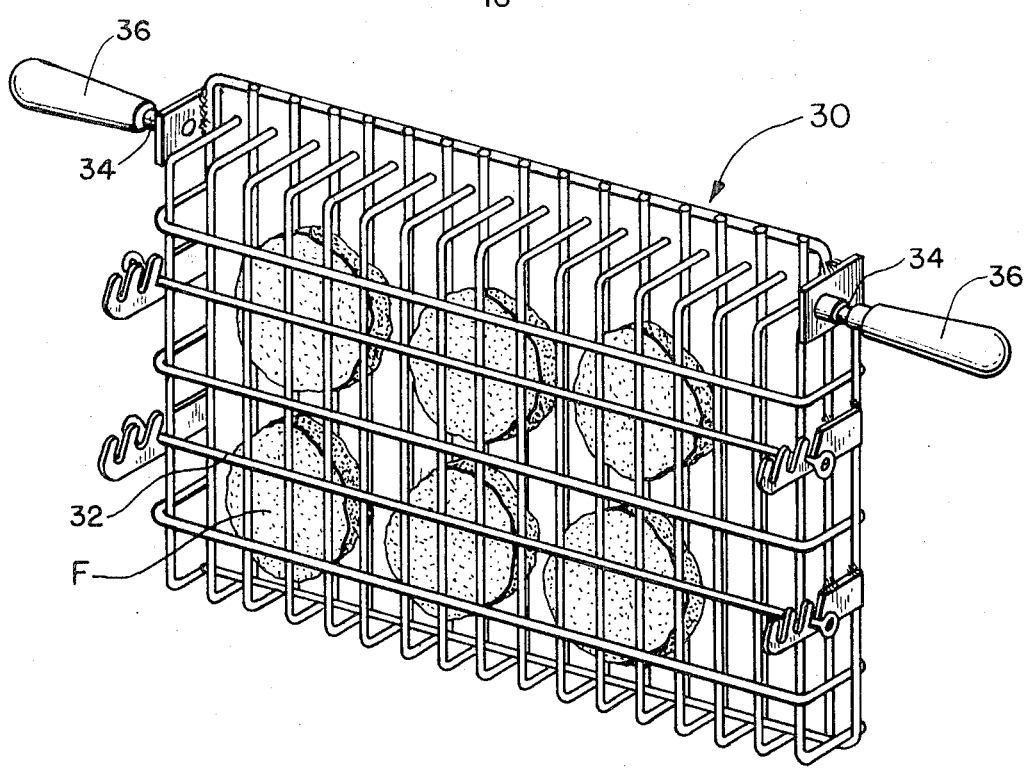
FIG. 5 is a perspective view of the basket-type food holding member, illustrated in FIG. 3.

Referring to FIG. 4, it will be seen that the housing is also adapted to alternately accommodate a food holding member in the form of a spit or rod 40, having at one end thereof a spindle 42 carrying a handle 40, and having at the other end thereof a preferably squared portion 46 adapted to be received within a chuck 47 of a motor 48 which may be mounted on one of the end walls 22, as at 49.

As best seen in FIGS. 3 and 4, the heating material members are preferably in the form of baskets 50, each having an open grill plate 52 on one side thereof and a closed back plate 54 on the opposite side thereof. The back plate is preferably formed of a reflective material to increase the heating efficiency. At its upper ends each heating material holding member 50 is provided with a pair of axially aligned, outwardly projecting shafts or spindles 50 carrying handles 58 at their outer extremities.

Although in the embodiment illustrated in the drawings the heating material is shown as conventional pieces of charcoal, it is to be understood that, if desired, the heating material may consist of some permanent type of material, such as rocks or stones, heated by a gas flame or other means (not shown) which are well known in the art, without departing from the spirit of this invention which is concerned with the relationship of the heating material member to the food holding member.

As best seen in FIG. 3, each of the end walls 22 is provided with a raised center portion 60, presenting in its upper edge a central channel or recess 62 aligned with the corresponding recess of the other end wall and adapted to receive the spindle portions 34 of the food holding member 30 so that the food holding member is disposed in a vertical position along the lingitudinal vertical center plane of the housing. One of the end walls 22 is also provided with an inclined, elongated slot or recess 64, the lower extremity of which is about midway between the top and bottom of the housing and which is adapted to receive the spindle portion 42 of a food holding member 40, if the spit rather than the basket type member is used to hold the food. As previously mentioned, the opposite end portion 40 of the spit 40 is adapted to be received within the chuck of motor 48.

Still referring to FIG. 3, it will be seen that each of the end walls is provided at its upper edge with a plurality of transversely spaced channels or recesses 66, located outboardly of central recesses 62 and 64, and each being aligned with the corresponding recess of the other end wall and cooperate therewith for receiving spindle portions 66 at opposite ends of heating material holding members 50. Thus it will be appreciated that when the maximum heat is desired, the heating material holding members may be positioned at their most inboard positions and as less intense heat is desired, they may be moved outboardly to alternate positions further from the center of the housing and from the food being cooked. Thus, the arrangement affords a great deal of flexibility in controlling the amount of heat transmitted to the food being cooked, as the positioning of the heating material holding members can be readily changed at any time throughout the cooking process, by merely lifting the handles and moving the heating material holding members.

It will be noted that, to facilitate the draft required for heating, lower portions of the side and end walls may be provided with a plurality of vent openings 68.

One of the primary advantages of a vertical grill arrangement is the fact that the drippings from the food being cooked do not come in contact with the heating material but instead fall directly downward. In the present device the drippings may be trapped in a longitudinal extending drain trough 70, supported on the bottom wall 20 of the housing and preferably designed to slope downwardly toward the end wall 22 of the housing where the drippings may pass from the drain through a tube 72 which extends through an opening 74 in the housing end wall and into a drain pan 76, which may be removably attached to the housing end wall by means of a hook 78.

Thus it will be seen that the invention provides a unique vertical grill device having all of the advantages of known grill arrangements of this type, plus the additional advantages of a simple arrangement for selectively positioning the heating material and food holding members in various positions and also to facilitate removal and insertion of the heating material and food holding members for filling them, emptying them, or for cleaning the members, as well as the interior of the housing itself.

We claim:

1. In a verticle grill device for cooking food by means of heating material such as charcoal or the like, the combination of:
    a. a base;
    b. a box-like housing supported on said base and including:
        i. a bottom wall;
        ii. opposed pairs of end walls;
        iii. opposed pairs of side walls;
        iv. a cover hingedly attached to at least one of said side walls;
    c. a first member for holding the food to be cooked;
    d. a pair of second members for holding the heating material;
    e. said end walls having raised center portions which present opposed first recesses aligned longitudinally of the housing with each other for removably receiving opposite end portions of said first member;
    f. said end walls also having, on either side of said first recesses, lower side portions which present opposed sets of second recesses aligned longitudinally of the housing with each other for removably receiving opposite end portions of said second members to provide selectively alternate positions for said second members relative to said first members.

2. A device according to claim 1, and including a dripping trough supported on said bottom wall of the housing under said food holding member and having communication with a removable pan detachably positioned on the outside of an end wall of the housing.

3. A device according to claim 1, wherein said end and side walls have inwardly inclined lower portions each presenting a plurality of spaced vent openings therein.

4. A device according to claim 1, wherein said cover is hinged to its related side wall by a hinge arrangement wherein said cover is supported in a horizontal plane when in the open position to serve as a shelf for retaining the food holding and heating material holding members for loading or unloading.

5. A device according to claim 1, wherein said food holding member comprises a basket having projecting outwardly from opposite ends thereof spindle elements, which are receivable in said first recesses of said end walls, and which include handle elements at their outer extremities.

* * * * *